Sept. 8, 1925.
A. S. RUTT
1,553,113
LIQUID DISPENSING DEVICE
Filed July 11, 1922
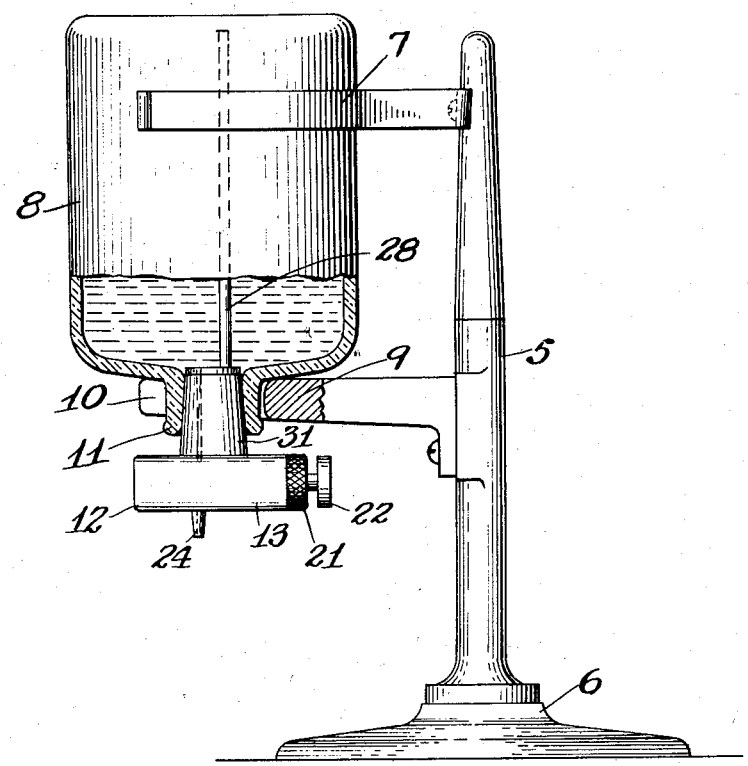
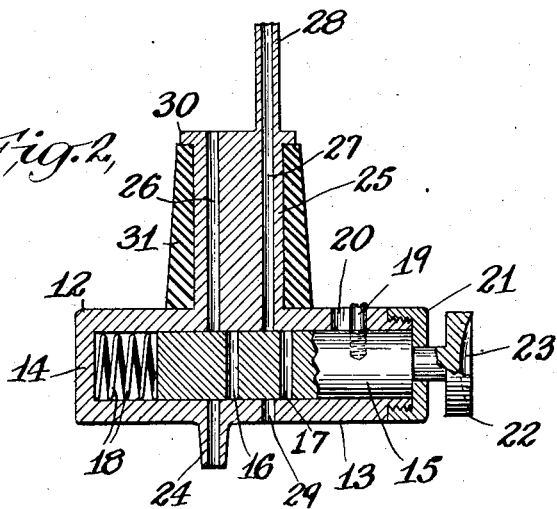
Inventor
Amos S. Rutt
By his Attorneys
Edgar Tate &Co Patented Sept. 8, 1925.

1,553,113

UNITED STATES PATENT OFFICE.

AMOS S. RUTT, OF BROOKLYN, NEW YORK.

LIQUID-DISPENSING DEVICE.

Application filed July 11, 1922. Serial No. 574,206.

*To all whom it may concern:*

Be it known that I, AMOS S. RUTT, a citizen of the United States, and residing at Brooklyn, in the county of Kings and State of New York, have invented certain new and useful Improvements in Liquid-Dispensing Devices, of which the following is a specification, such as will enable those skilled in the art to which it appertains to make and use the same.

This invention relates to devices for dispensing liquids of various kinds and classes and particularly to what is known as liquid soap, and the object of the invention is to provide a device of the class specified which is so constructed as to permit of its attachment and detachment from a liquid soap or other container at will without the use of threads or other means of attachment, the device being frictionally held in position, in the neck portion of a container; a further object of the invention being to provide means for normally closing the admission to said container, said means being movable into position to admit air to the container and to permit of the discharge of the contents of such container through said device; and with these and other objects in view the invention consists in a device of the class and for the purpose specified which is simple in construction, efficient in use and which is constructed and operated as hereinafter described and claimed.

The invention is fully disclosed in the following specification, of which the accompanying drawing forms a part, in which the separate parts of my improvement are designated by suitable reference characters in each of the views, and in which:—

Fig. 1 is a view diagrammatically illustrating the use of my improved dispensing device; and, Fig. 2 a sectional detail view of the device shown in Fig. 1 detached.

For the purpose of illustrating one method of carrying my invention into effect, I have shown at 5, a standard mounted upon or in connection with a suitable base 6, the standard being provided at the top thereof with arms 7 adapted to encircle or partially encircle a suitable container 8 in the form of a bottle, in the construction shown, said bottle being adapted to rest upon a support or seat member 9 secured to the standard, the member 9 being provided with a forked head 10 adapted to receive the neck 11 of the container, and at 12 I have shown my improved dispensing device mounted in connection with the container 8 and shown supported in the neck portion 11 thereof. The dispensing device 12 comprises a tubular casing 13 closed at one end as shown at 14, and in the bore of which is mounted a plunger 15 having two ports 16 and 17, and the plunger 15 is normally held in the position shown in Fig. 2 by a spring 18, and is held against rotation by a pin or screw 19 passing through an elongated aperture 20 in the casing 13. The other end of the casing 13 is closed by a cap 21 which retains the plunger 15 in position, and said plunger extends through the cap and is provided with a button-shaped head 22, the outer face of which is preferably recessed as shown at 23 to receive a finger of a hand.

The casing 13 is provided with a discharge spout 24 in connection with which the bore 16 of the plunger 15 is adapted to register and the casing 13 is provided with an upwardly directed extension 25 having a bore 26 with which the bore 16 is adapted to register, another vent bore 27 extends through the extension 25 and through an upwardly directed tube 28 and the bore 17 of the plunger is adapted to register with said bore 27 and with another vent bore 29 in the casing 13 when the plunger is moved inwardly.

The top of the extension 25 is preferably flanged as shown at 30 and a tapered packing ring 31 is mounted upon the extension 25 as clearly shown in Fig. 2, and in the use of the device the same is placed in the neck portion of a bottle or other container with the contents therein when in an upright position, after which the bottle is inverted and mounted in connection with the standard 5, or the member 9 and spring arms 7 thereof.

It will be understood that the standard 5 may be mounted upon any suitable support preferably adjacent to a wash basin or upon said wash basin, or if desired the container 8 may be mounted in connection with any suitable support, my invention being not necessarily limited to the support herein shown and described.

It will also be understood that the vent tube 28 extends into the top portion of the container 8, as indicated in Fig. 1, and in the position of the plunger shown the vent tube 28 is normally closed to atmosphere due to the position of the plunger 15 and the bore or port 26 and the nozzle 24 are also closed thus forming a seal for the container 8 to prevent evaporation or other actions on the liquids employed in the container, and when it is desired to discharge a portion of the contents the palm of a hand is placed beneath the nozzle 24, and one finger of such hand is placed upon the button-shaped head 22 and pressure is applied thereto to force the plunger 15 inwardly to open the bores or ports, or to bring the bores 16 and 17 in communication therewith to permit air to pass upwardly through the vent tube 28 into the top of the container 8, thus permitting the discharge of the contents of such container by gravity through the nozzle 24 into the palm of the hand of the operator, and upon releasing the plunger 15 the spring will normally return the same into an inoperative position, in other words, the plunger 15 functions as a plunger valve.

It will be understood that I am not necessarily limited to the use of any particular substance in the container, nor am I limited to the use of a container of any specific form and construction, and various changes in and modifications of my improved dispensing device, as herein shown and described, may be made, within the scope of the appended claims, without departing from the spirit of my invention or sacrificing its advantages.

Having fully described my invention, what I claim as new and desire to secure by Letters Patent, is:—

1. A device of the class described comprising a tubular body having vent and discharge passages, a plunger movably mounted in said body and provided with passages adapted to register with said first named passages, tensional means for holding said plunger normally in an inoperative position, and said plunger extending through one end of said tubular body and provided with a finger piece by means of which said plunger may be manually operated.

2. A device of the class described comprising a tubular body having vent and discharge passages, a plunger movably mounted in said body and provided with passages adapted to register with said first named passages, tensional means for holding said plunger normally in an inoperative position, said plunger extending through one end of said tubular body and provided with a finger piece by means of which said plunger may be manually operated, the central portion of said tubular body being provided with an extension, and a packing ring mounted on said extension.

3. A device of the class described comprising a tubular body having vent and discharge passages, a plunger movably mounted in said body and provided with passages adapted to register with said first named passages, tensional means for holding said plunger normally in an inoperative position, said plunger extending through one end of said tubular body and provided with a finger piece by means of which said plunger may be manually operated, the central portion of said tubular body being provided with an extension, a packing ring mounted on said extension, and means for retaining said packing ring in position.

4. A device of the class described comprising a tubular body having vent and discharge passages, a plunger movably mounted in said body and provided with passages adapted to register with said first named passages, tensional means for holding said plunger normally in an inoperative position, said plunger extending through one end of said tubular body and provided with a finger piece by means of which said plunger may be manually operated, the central portion of said tubular body being provided with an extension, a packing ring mounted on said extension, means for retaining said packing ring in position, and a vent tube extending from said extension and adapted to be placed in communication with the vent passage of said tubular body.

5. The combination with a bottle-shaped container, of a dispensing device adapted to be frictionally held in the neck portion of said container, said device being provided with a vent tube adapted to extend into the top portion of said container when inverted, said device being provided with vent and discharge passages and a plunger valve normally closing said passages, and adapted to be manually operated to move the same into position to open both of said passages and to place said vent tube in communication with said vent passage.

6. The combination with a bottle-shaped container, of a dispensing device adapted to be frictionally held in the neck portion of said container, said device being provided with a vent tube adapted to extend into the top portion of said container when inverted, said device being provided with vent and discharge passages and a plunger valve normally closing said passages and adapted to be manually operated to move the same into position to open both of said passages and to place said vent tube in communication with said vent passage, and tensional means for holding said plunger valve normally in an inoperative position.

7. The combination with a bottle-shaped container, of a dispensing device adapted to be frictionally held in the neck portion of said container, said device being provided with a vent tube adapted to extend into the top portion of said container when inverted, said device being provided with vent and discharge passages, a plunger valve normally closing said passages and adapted to be manually operated to move the same into position to open both of said passages and to place said vent tube in communication with said vent passage, tensional means for holding said plunger valve normally in an inoperative position, and means for preventing the rotation of said valve.

In testimony that I claim the foregoing as my invention I have signed my name this 8th day of July 1922.

AMOS S. RUTT.